US007017154B2

(12) United States Patent
Haber et al.

(10) Patent No.: US 7,017,154 B2
(45) Date of Patent: Mar. 21, 2006

(54) ELIMINATING STORE/RESTORES WITHIN HOT FUNCTION PROLOG/EPILOGS USING VOLATILE REGISTERS

(75) Inventors: Gad Haber, Nesher (IL); Moshe Klausner, Rramat Yishai (IL); Vadim Eisenberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 10/096,827

(22) Filed: Mar. 14, 2002

(65) Prior Publication Data

US 2002/0196678 A1   Dec. 26, 2002

Related U.S. Application Data

(60) Provisional application No. 60/278,488, filed on Mar. 23, 2001.

(51) Int. Cl.
G06F 9/45 (2006.01)
(52) U.S. Cl. ........................ 717/159; 717/158
(58) Field of Classification Search ............... 717/151, 717/159, 158
See application file for complete search history.

(56) References Cited

U.S. PATENT DOCUMENTS

| 5,457,799 | A | * | 10/1995 | Srivastava | 717/160 |
|---|---|---|---|---|---|
| 5,768,595 | A | * | 6/1998 | Gillies | 717/145 |
| 5,790,865 | A | * | 8/1998 | Smaalders et al. | 717/158 |
| 5,950,009 | A | * | 9/1999 | Bortnikov et al. | 717/158 |
| 5,966,539 | A | * | 10/1999 | Srivastava | 717/156 |
| 5,999,737 | A | * | 12/1999 | Srivastava | 717/162 |
| 6,070,009 | A | * | 5/2000 | Dean et al. | 717/130 |
| 6,292,934 | B1 | * | 9/2001 | Davidson et al. | 717/158 |
| 6,854,110 | B1 | * | 2/2005 | Gillies et al. | 717/159 |
| 6,862,730 | B1 | * | 3/2005 | Gorti et al. | 717/159 |
| 2001/0018985 | A1 | | 9/2001 | Kanechika et al. | |

OTHER PUBLICATIONS

Aho et al., "Compilers, Principles, Techniques and Tools", Addison-Wesley, 1986, p. 585-722.*
Milo Martin, et al, Exploiting Dead Value Information:, Published in Proceedings of MICRO-30, Dec. 1-3, 1997, Research Triangle Park, North California, pp. 1-11.
Robert Cohn et al, "Optimizing Alpha Executables on Windows NT with Spike", Digital Technical Journal, vol. 9, No. 4, pp. 3-20, 1997.
Robert Cohn et al., "Hot Cold Optimization of Large Windows/NT Applications" Published in Proceedings of MICRO 29, Dec. 2, 1996 Research Triangle Park, North California.
Robert Muth et al "Alto: A Link-Time Optimizer for the Compaq Alpha" [online] Nov. 2, 1999. Retrieved from Internet <http://www.cs.Arizona.edu/alto>.
Gadi Haber et al, "Reliable Post-link Optimizations Based on Partial Information", Proceedings of Feedback Directed and Dynamic Optimizations Workshop 3, Dec. 2000, Monterey, California, pp. 91-100.

(Continued)

Primary Examiner—Tuan Dam
Assistant Examiner—Eric B. Kiss
(74) Attorney, Agent, or Firm—Browdy and Neimark, PLLC (57) ABSTRACT

A post-link optimization method for renaming non-volatile registers with unused volatile registers, then removing the non-volatile register store/restore instructions from a function prolog/epilog. The volatile registers are saved before each function call and restored immediately afterwards. The optimization method is worthwhile if all of the call instructions are rarely invoked relative to the function prolog/epilog. The method requires that the hot function be disassembled, but does not require the full control flow graph.

33 Claims, 2 Drawing Sheets

OTHER PUBLICATIONS

Ealan Henis et al, "Feedback Based Post-link Optimization for Large Subsystems", Second Workshop on Feedback Directed Optimization, Nov. 1999, Haifa, Israel, pp. 13-20.

W.J. Schmidt et al, "Profile-directed Restructuring of Operating System Code", IBM Systems Journal, vol. 37, No. 2, 1998, pp 270-297.

Ted Romer et al, "Instrumetnation and Optimization of Win32/Intel Executables Using Etch", University of Washignton, 1998.

Amitabh Srivastava and David Wall, "A Practical System for Intermodule Code Optimization at Link-Time", WRL Research Report 92/6, Dec. 1992.

R.R. Heisch, "Trace-Directed Program Restructuring for AIX Executables", Ibm J. Res. Develop., vol. 38, No. 5, pp 595-603, Sep. 1994.

Nikolas Gloy, et al, "Procedure Placement Using Temporal Ordering Information", Published in Proceeding of MICRO-30, Dec. 1-3, 1997, Research Triangle Park, North Carolina, pp. 1-11.

Steven S. Muchnick, Advanced Compiler Design and Implementation, Morgan Kaufmann Publishers, San Francisco, California, 1997, Section, 5.6 (pp. 119-127), Section 15 (pp. 461-479), and Section 19 (pp. 607-667).

* cited by examiner

FIG. 2

ELIMINATING STORE/RESTORES WITHIN HOT FUNCTION PROLOG/EPILOGS USING VOLATILE REGISTERS

CROSS-REFERENCE TO RELATED APPLICATIONS

This application claims the benefit of U.S. Provisional Patent Application No. 60/278,488, filed Mar. 23, 2001. It is also related to U.S. patent application Ser. No. 09/798,879, filed Mar. 2, 2001, and to a U.S. patent application entitled, "Eliminating Cold Register Store/Restores Within Hot Function Prolog/Epilogs," and another U.S. patent application entitled "Percolating Hot Function Store/Restores to Colder Calling Functions," both filed on even date. All of these applications are assigned to the assignee of the present patent application, and their disclosures are incorporated herein by reference.

FIELD OF THE INVENTION

The present invention relates generally to optimization of computer code to achieve faster execution, and specifically to optimizing object code following compilation and linking of the code.

BACKGROUND OF THE INVENTION

Post-link code optimizers generally perform global analysis on the entire executable code, including statically-linked library code. Since the executable code will not be re-compiled or re-linked, the post-link optimizer need not preserve compiler and linker conventions. It can thus perform aggressive optimizations across compilation units, in ways that are not available to optimizing compilers. Additionally, a post-link optimizer does not require the source code to enable its optimizations, allowing optimization of legacy code and libraries where no source code is available.

At the same time, post-link optimizers must deal with difficulties that are not encountered in compile-time optimization. Optimizing compilers operate on input in the form of high-level language description, typically source code, whose semantics are clearly defined. By contrast, static post-link optimization tools receive as their input low-level executable instructions (object code). The post-link optimizer must first attempt to disassemble the object code in order to identify the data and instructions contained in the code. Even after disassembly, the semantics of executable code given to a post-link optimizer may be only partially known, for the following reasons:

Code instructions and data within an executable object are intermingled, making it impossible in some cases to distinguish between the two. Typically, there are code areas that cannot be classified unequivocally by the optimizer as either data or code instructions. In the context of the present patent application, these areas are referred to as "non-classified code areas."

Even for fully-classified code areas that are known to contain code instructions, the semantics of the program cannot always be determined. Machine instructions operate on registers, which may contain either data information or memory locations. Therefore, the optimizer may be uncertain as to whether a given instruction performs a pure data computation, or whether it calculates an address to be used later in the program to retrieve/store data or to perform a control transfer within the program code.

Data elements and their types, such as arrays, structures or scalars, can be identified only in a high-level language, such as C, C++, Pascal, etc. In post-link code, these elements appear as arbitrary data areas, and references to them are treated as arbitrary addresses. Therefore, at the post-link level, references to data elements cannot be fully resolved.

Because of these factors, the code semantics of the program may never be fully extracted from post-link code, and some of the dependencies between the data and code elements used by the program may remain uncertain.

Haber et al. describe an approach for dealing with these difficulties in an article entitled, "Reliable Post-Link Optimizations Based on Partial Information," in Proceedings of *Feedback Directed and Dynamic Optimizations Workshop* 3 (Monterey, Calif., December, 2000), pages 91–100, which is incorporated herein by reference. First, the program to be optimized is disassembled into basic blocks, by incrementally following all control flow paths that can be resolved in the program. The basic blocks are marked as either code, data or unclassified (not fully analyzed). Code blocks are further flagged according to their control flow properties. Partially analyzed areas of the program are delimited so as to contain the unclassified blocks, while relieving the rest of the program of the limitations that these blocks impose on optimization. The partially analyzed areas are chosen so that even when they cannot be internally optimized, they can still be repositioned safely en bloc to allow reordering and optimization of the code as a whole.

Use of post-link runtime profiling as a tool for optimization and restructuring is described by Henis et al., in "Feedback Based Post-Link Optimization for Large Subsystems," Second Workshop on *Feedback Directed Optimization* (Haifa, Israel, November, 1999), pages 13–20; and by Schmidt et al., in "Profile-Directed Restructuring of Operating System Code," *IBM Systems Journal* 37:2 (1998), pages 270–297. These publications are incorporated herein by reference.

Runtime profiling of the program creates a log recording usage statistics of each code block in two stages. First, in an instrumentation stage, each basic block is modified with either a new header or footer, wherein the added code increments a counter every time that basic block is run. In the second stage (the execution stage), the modified program is executed. At the end of the execution, the counters are written into a log file. Statistical analysis of the frequency of use of each basic block provides a method to rank the code blocks by importance. Code blocks that are frequently executed are called "hot" blocks, as opposed to rarely executed "cold" blocks.

When a function using certain registers is called during execution of a program, it is generally necessary to store (save to memory) the contents of these registers before the function starts to run, and then to restore the register contents when the function returns. For this purpose, compilers typically add appropriate store instructions to a prolog of the function in the compiled code, with corresponding restore instructions in an epilog. The registers stored and restored in this manner are termed non-volatile registers, since the caller function can assume that the values in these registers will remain unchanged across the function call. Other registers used in the function, whose values are not stored/restored in the function prolog/epilog are termed volatile registers, since the caller function cannot assume that the register value will remain unchanged by the function call. The caller function is responsible for saving volatile register values if the value is needed across the function call. Because memory access has become a bottleneck for modern high-speed processors, eliminating superfluous store and restore operations can reduce program execution time substantially.

Martin et al. describe a method of compiler optimization based on eliminating storing and restoring the contents of dead registers in "Exploiting Dead Value Information," published in Proceedings of Micro-30 (Research Triangle Park, North Carolina, 1997), which is incorporated herein by reference. Dead value information, providing assertions as to future use of registers, is calculated at compile time. The authors suggest that processor instruction set architectures be extended to enable this information to be communicated to the processor. In the absence of this hardware specialization, standard RISC call conventions may still allow a subset of the dead value information to be inferred and used by the processor in eliminating some of the store and restore operations at procedure calls and returns.

Cohn and Lowney describe a method of post-link optimization based on identifying frequently executed (hot) and infrequently executed (cold) blocks of code in functions in "Hot Cold Optimizations of Large Windows/NT Applications," published in Proceedings of Micro 29 (Research Triangle Park, North Carolina, 1996) which is incorporated herein by reference. The object code is disassembled into component code blocks, and the control flow graph (CFG) of the flow of control through the program is constructed. Code blocks are classified into code (instructions) and data. The code sections are further classified into functions. Using profile information, the functions are analyzed to find code blocks that are rarely executed. By experimentation, the authors chose to optimize functions containing blocks with less the 1% probability of execution. The code blocks in such functions that are on the primary path of execution are labeled "hot," and the rarely executed code blocks are labeled "cold." All hot blocks of code in the hot function are copied to a new location. All calls to the function are redirected to the new location. Flow paths in the hot routine that target cold code blocks are redirected to the appropriate location in the original function. Once the control path returns to the original function, it does not pass back to the copied function.

The new function is then optimized at the expense of paths of execution that pass through the cold path. The optimization comprises identifying unneeded code in the new hot function, and moving it to a stub that is called when the cold portion of the function is invoked, before actually returning to the original function. Cohn and Lowney describe five different types of optimization of the hot code:

Partial dead code elimination—the removal of dead code from the hot function. Once the cold code is removed from the hot function, some of the remaining instructions may be superfluous. An example of such an instruction is an add instruction that writes to a register that is only referenced within the cold code but is positioned within the hot block. The dead code is moved to the stub.

Non-volatile register elimination—the removal of the save and restore of non-volatile registers in the hot procedure. Non-volatile registers must be stored (restored) in the function prolog (epilog). Once dead code is removed from the hot function, the use of the non-volatile registers in the hot function is analyzed. If the registers are only referenced in the cold code, the store (restore) instructions are removed from the prolog (epilog) of the hot function, and the store instructions are moved to the stub. Since the cold code is followed by the original function epilog, the original restore instructions will restore the registers.

Stack pointer adjust elimination—the removal of the stack adjusts in the hot function. If all the non-volatile store instructions can be removed from the function prolog, the stack pointer adjustment (on computer architectures that require stack adjusts) can also be moved to the stub.

Peephole optimization—the removal of self-assignments and conditional branches with an always-false condition. Once the dead code is removed and excess non-volatile registers are freed, an additional pass through the code can identify instructions that are now irrelevant. An example of such an instruction is a restore instruction of a removed register that was turned into a self-assignment by copy propagation.

Inlining the hot function—the removal of control transfer to the hot function. Code straightening can be applied to the optimized code to inline the hot function.

Cohn and Lowney have implemented their methods of optimization in a tool named "Spike," which is used to optimize executables for the Windows NT™ operating system running on Alpha™ processors. Their method of classifying blocks as hot or cold requires a complete understanding of the CFG. It cannot be used if unclassified blocks appear in the control flow of the hot function. The method of eliminating non-volatile registers also requires that there be no references to the non-volatile register left in the function after removal of dead code. Additionally, the method of elimination of non-volatile registers requires duplication of the hot code to a new location.

Muth et al. describe the link-time optimizer tool "alto" in "alto: A Link-Time Optimizer for the Compaq Alpha," published in *Software Practice and Experience* 31 (January 2001), pages 67–101, which is incorporated herein by reference. Alto exploits the information available at link time, such as content of library functions, addresses of library variables, and overall code layout, to optimize the executable code after compilation. Alto can identify control paths where stores (restores) of non-volatile registers in function prologs (epilogs) are unnecessary, either because the registers are not touched along all execution paths through a function, or because the code that used those registers became unreachable. Code can become unreachable due to other optimizations carried out by alto, for instance because the outcome of a conditional branch could be predicted as a result of interprocedural constant propagation. The number of such stores (restores) can be reduced by moving them away from execution paths that do not need them.

Alto is similar to Spike in that its optimizations require a complete understanding of the control flow within the function. The store (restore) replacements are only carried out after other optimization techniques have created dead code within the function.

SUMMARY OF THE INVENTION

Preferred embodiments of the present invention provide generalized methods for post-link reduction of store and restore instructions in function prologs and epilogs based on run-time profiler feedback information, in order to optimize program execution. The methods of the present invention enable global program optimization, since they treat the entire executable code as a unified whole, unlike compiler optimizations, which are generally limited to the scope of the optimization unit.

Furthermore, while optimizing compilers are bound by linkage conventions, the post-link optimizer can ignore these conventions in removing unnecessary store and restore instructions. The methods of the present invention can thus be used to eliminate unneeded memory operations more thoroughly than is possible when only compile-time tools are used. These methods can be used for code optimization even when the source code is unavailable for compile-time optimizations, as may be the case when legacy object code or statically-linked object code libraries are incorporated in the executable. In addition, the methods of the present invention can be used even when the control flow within the program is only partially understood.

In preferred embodiments of the present invention, a post-link optimizer disassembles post-link object code in order to identify basic blocks of code in the executable file. It is not necessary to analyze the entire control flow graphs of the functions, as in optimization methods known in the art, but only to determine their constituent instructions. Basic blocks are identified as functions, code within functions, and data. The functions typically have a prolog and an epilog, containing store and restore instructions with respect to at least some registers used by the function. These registers are referred to herein as non-volatile registers. Preferably, run-time profiling, as is known in the art, is used to identify hot (i.e., frequently-called) functions and cold call instructions to other functions, herein referred to as callee functions, within the hot functions.

The optimizer locates unused volatile registers, i.e. volatile registers which are not referenced at all within the function, in a fully-disassembled hot function. It replaces non-volatile registers that are stored/restored in a hot function prolog/epilog, with the unused volatile register. Unfortunately, this optimization method is not feasible on its own in the presence of call instructions within the function, since the volatile registers may be altered within the callee function and as a result, the information they hold may be lost. Therefore, when the call instructions in the hot function are rarely invoked during run-time, the optimizer saves the volatile registers before each function call within the hot function and restores them immediately afterward. The optimizer then modifies the post-link code so as to eliminate at least one pair of the unneeded store/restore instructions from the function prolog/epilog of the hot function.

Preferably, the optimizer replaces each call instruction in the hot function with a branch instruction to wrapper code. The wrapper code comprises a store instruction for each volatile register used in place of a non-volatile register within the body of the function, the original call instruction to the callee function, a restore instruction for each of the volatile registers, and a branch to the instruction immediately following the call to the wrapper code.

The wrapper code is preferably appended to the end of the original post-link code. Although the optimized code is typically longer than the original post-link code, and although the branch instructions to and from the wrapper code can cause cache misses, additional optimization steps as are known in the art, such as code straightening, can be applied to the code after the wrapper code has been added in order to alleviate these problems. Typically, after performing the optimization described above, a code-straightening algorithm is applied to the generated code in order to remove the unconditional branches to and from the wrapper codes. Straightening algorithms are known in the art of post-link optimization tools, such as the FDPR (Feedback Directed Program Restructuring) tool offered by IBM Corporation (Armonk, N.Y.) as part of the Performance Tool Box (PTX) for the AIX™ operating system. Further aspects of the FDPR are described in the above-mentioned articles by Haber et al., Henis et al., and Schmidt et al.

There is therefore provided, in accordance with a preferred embodiment of the present invention, a method for code optimization, including:

disassembling object code that has been compiled and linked;

analyzing the disassembled code so as to identify a first function in the code, the first function including store and restore instructions with respect to one or more non-volatile registers and further including a call instruction to a second function that is performed infrequently when the first function is run;

identifying one or more volatile registers unused in the first function; and modifying the code so as to replace each reference in the first function to at least one of the non-volatile registers with a reference to a corresponding one of the unused volatile registers, and so as to eliminate at least one pair of the store and restore instructions in the first function with respect to the at least one of the non-volatile registers while storing the corresponding one of the volatile registers before the call instruction to the second function and restoring the corresponding one of the volatile registers after the call instruction to the second function.

Preferably, analyzing the disassembled code includes profiling the code so as to determine a frequency of calls made by the first function, including the call instruction to the second function, and modifying the code includes modifying the first function only if the frequency of the calls is less than about one call each time the first function is run.

Preferably, modifying the code includes replacing the call instruction with a branch to a wrapper code that contains the call instruction, together with store and restore instructions with respect to the corresponding one of the volatile registers.

More preferably, the object code comprises a fixed sequence of code instructions ending with a last instruction, and the wrapper code is added to the code after the last instruction, and replacing the call instruction comprises replacing the instruction with the branch to the wrapper code without altering the fixed sequence within the code.

Preferably, analyzing the code includes identifying a further one of the non-volatile registers to which there is no reference made in the first function, and modifying the code includes eliminating at least one pair of the store and restore instructions in the first function with respect to the further one of the non-volatile registers, while adding store and restore instructions to the wrapper code with respect to the further non-volatile registers.

Preferably, the function includes a fixed sequence of code instructions, and modifying the code includes eliminating the at least one pair of the store and restore instructions without altering the fixed sequence.

More preferably, modifying the code to eliminate the at least one pair of the store and restore instructions includes reordering the instructions so as to make the store instruction a first instruction in the function, and further modifying control transfers to the function in the code so as to skip over the store instruction.

Further preferably, the function includes a final instruction to transfer control upon completion of the function, and modifying the code to eliminate the at least one pair of the store and restore instructions includes reordering the instructions so as to make the restore instruction a last instruction in the function before the instruction to transfer control, and further replacing the restore instruction with the control transfer instruction.

Preferably, when the at least one pair of the store and restore instructions comprises a single instruction that acts upon a plurality of registers, modifying the code to eliminate the at least one pair of the store and restore instructions includes modifying the single instruction to act upon a subset of the plurality of registers.

In an alternative embodiment, modifying the code includes recompiling the object code.

Preferably, storing the corresponding one of the volatile registers includes saving a value of the corresponding one of the volatile registers to a memory location reserved on a program stack for the at least one of the non-volatile registers.

There is additionally provided, in accordance with a preferred embodiment of the present invention, an apparatus for code optimization, including a code processor, which is arranged to disassemble object code that has been compiled and linked, and to analyze the disassembled code so as to identify a first function in the code, the first function including store and restore instructions with respect to one or more non-volatile registers and further including a call instruction to a second function that is performed infrequently when the first function is run. The code process is arranged to identify one or more volatile registers unused in the first function, and to modify the code so as to replace each reference in the first function to at least one of the non-volatile registers with a reference to a corresponding one of the unused volatile registers, and so as to eliminate at least one pair of the store and restore instructions in the first function with respect to the at least one of the non-volatile registers while storing the corresponding one of the volatile registers before the call instruction to the second function and restoring the corresponding one of the volatile registers after the call instruction to the second function.

There is additionally provided, in accordance with a preferred embodiment of the present invention, a computer software product, including a computer-readable medium in which software is stored, which software, when read by a computer, causes the computer to disassemble object code that has been compiled and linked, to analyze the disassembled code so as to identify a first function in the code, the first function including store and restore instructions with respect to one or more non-volatile registers and further including a call instruction to a second function that is performed infrequently when the first function is run. The instructions cause the computer to identify one or more volatile registers unused in the first function, and to modify the code so as to replace each reference in the first function to at least one of the non-volatile registers with a reference to a corresponding one of the unused volatile registers, and so as to eliminate at least one pair of the store and restore instructions in the first function with respect to the at least one of the non-volatile registers while storing the corresponding one of the volatile registers before the call instruction to the second function and restoring the corresponding one of the volatile registers after the call instruction to the second function.

The present invention will be more fully understood from the following detailed description of the preferred embodiments thereof, taken together with the drawings in which:

DETAILED DESCRIPTION OF PREFERRED EMBODIMENTS

Figure 1:
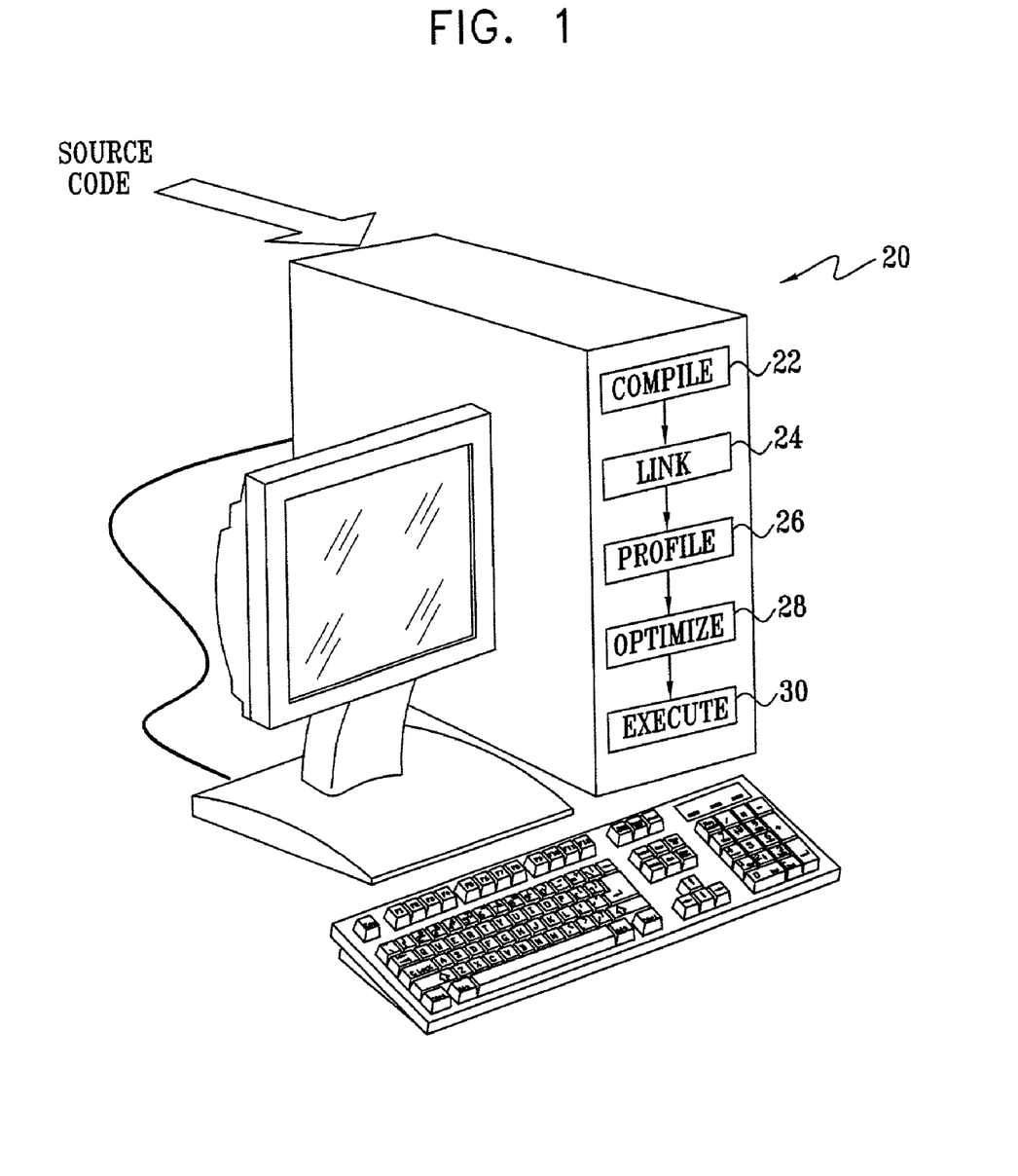
FIG. 1 is a block diagram that schematically illustrates a system for processing computer program code, in accordance with a preferred embodiment of the present invention.

FIG. 1 is a block diagram that schematically illustrates a system 20 for processing computer program code, in accordance with a preferred embodiment of the present invention. System 20 preferably comprises a general-purpose computer processor, which is programmed to carry out the functions described hereinbelow. The processor performs these functions under the control of software supplied for this purpose. The software may be downloaded to the processor in electronic form, over a network, for example, or it may alternatively be provided on tangible media, such as CD-ROM.

System 20 typically receives source code that is prepared by a programmer. A compiler 22 compiles the source code to generate object code, and a linker 24 links the compiled code with library code, as is known in the art. The linked code is fed to a profiler 26, which obtains run-time information about the frequency of use of each block of object code in the linked code. The profile information along with the original linked code is fed to an optimizer 28, which labels often-run blocks as "hot" and seldom-run blocks as "cold," and then analyzes and modifies the code to eliminate non-volatile register store/restore instructions located in the prolog and epilog of hot functions, as described in detail hereinbelow. The optimized code can then be executed by a run-time module 30, as is likewise known in the art. Although all of functions 22 through 30 are shown for simplicity as being performed in system 20, it will be appreciated that these functions may also be separated and carried out on different computers. Thus, optimizer 28, which is the element of concern to the present invention, may receive profiled post-link code from another source, outside system 20, and may pass the optimized code to yet another computer for execution.

Figure 2:
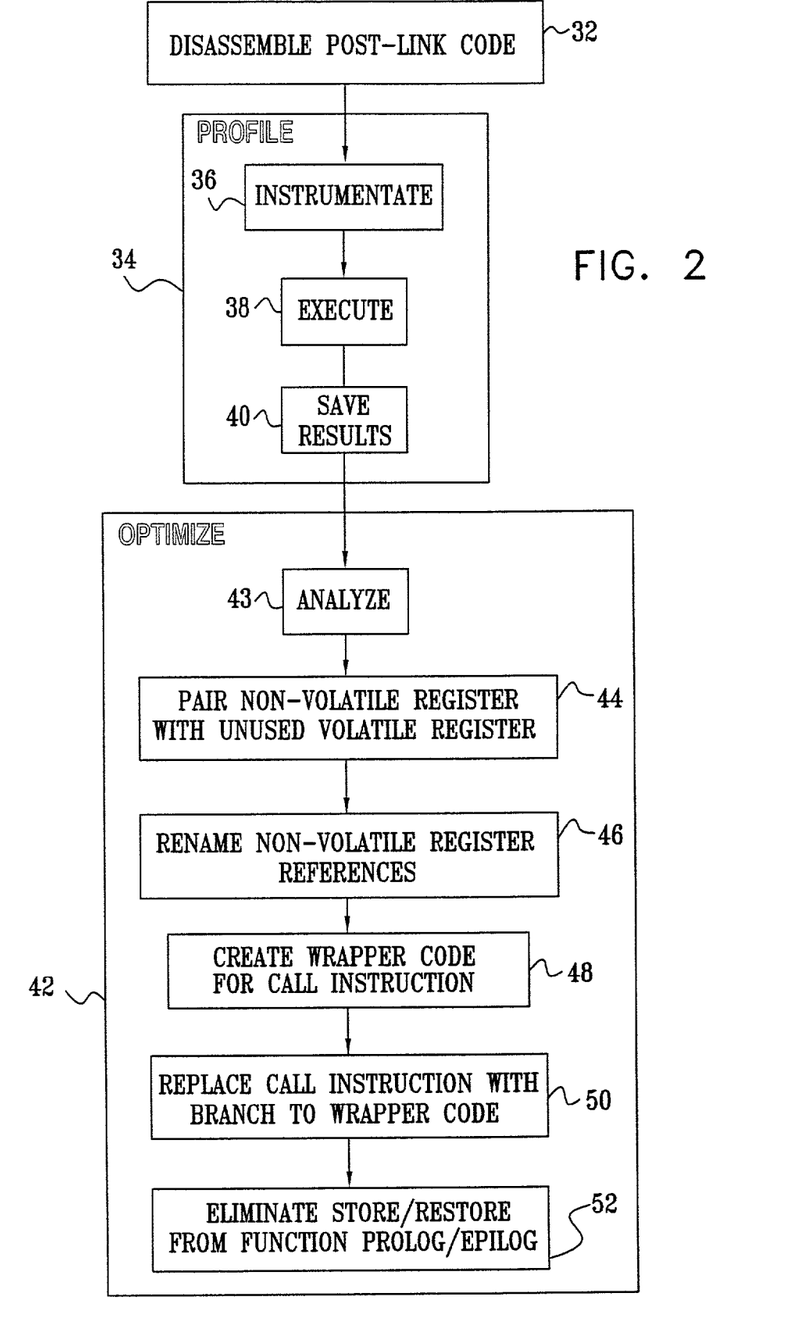
FIG. 2 is a flow chart that schematically illustrates a method for optimizing post-link code by eliminating store and restore instructions, in accordance with a preferred embodiment of the present invention.

FIG. 2 is a flow chart that schematically illustrates a method for optimizing post-link code by eliminating store and restore instructions, carried out by optimizer 28, in accordance with a preferred embodiment of the present invention. The post-link code is disassembled, at a disassembly step 32, in order to identify the instructions in the code. Any suitable method known in the art can be used for this purpose. Preferably, an incremental disassembly method is used to dissect the code into its basic blocks, as described in the above-mentioned articles by Haber et al. and by Henis et al., for example. For this purpose, addresses of instructions within the executable code are extracted from a variety of sources, in order to form a list of "potential entry points." The sources typically include program/DLL entry points, the symbol table (for functions and labels), and relocation tables (through which pointers to the code can be accessed). The optimizer traverses the program by following the control flow starting from these entry points—while resolving all possible control flow paths—and adding newly-discovered addresses of additional potential entry points to the list, such as targets of JUMP and CALL instructions.

Following the known control flow of the program in this manner covers a large percentage of the code. Basic blocks that are not directly discoverable by incremental disassembly are marked as "unclassified code." These blocks typically consist of code reached via a jump by a target register that is resolved only at runtime. It is sometimes possible to classify these blocks using instrumentation of the code and dynamic runtime analysis, as described by Henis et al., but a description of this method is beyond the scope of the present patent application.

At the end of the incremental disassembly process, the entire code section of the original program is dissected into basic blocks, which are either classified or unclassified. The classified blocks are marked with flags, which characterize them as either code or data (such as branch table data), and which identify the control flow properties of the code blocks, such as Fallthrough, Continue, Call, Return, Jump, etc. The Call and Return flags, inter alia, are used to identify functions and function calls in the code.

The disassembled code is profiled at a code profiling step 34. Profiling begins at an instrumentation step 36, wherein each basic block is modified so that each time the program execution passes through the block a counter is incremented, as described in the above-mentioned article by Henis et al., in section 2.3. Additional code is added to the beginning of each basic block, termed instrumentation code. This code performs a CALL jump to a universal stub function. The universal stub function makes use of the return address argument passed by the CALL instruction to identify from which basic block it was called. The counter for that basic block is incremented each time the universal stub is called from within that block during the profiling run. The universal stub function then returns execution to the calling basic block.

A second method of instrumentation, useful on platforms where no CALL instruction exists, comprises overriding the last instruction of each basic block with a JUMP instruction to a designated code area that is appended to the end of the original code section. In that area, the counter associated with the basic block is incremented. The overwritten last instruction that was taken from the original basic block is executed in the appended area, thus maintaining the original program semantics. Using this method, the original code section size is kept intact, and most of the code is unaltered (except the overwritten last instructions of the basic blocks, which in most cases are control transferring instructions).

The instrumented program is run at an execution step 38. On profiling run termination, the information is retrieved from the counters and written to a log file, at a save results step 40.

For each hot function, optimizer 28 carries out an optimization step 42. In the context of the present patent application, the following definitions and notation are used to describe the preferred method of optimization:

Non-volatile register—a register Rx is considered to be non-volatile in some function f if the value in Rx is saved in the prolog of f and then restored back in the epilog of f Therefore a function that calls f can assume that the value in Rx prior to the call is not affected by invoking f.

Volatile register—a register Rx is considered to be volatile in some function f if the value in Rx is not saved in the prolog of f. Therefore a function that calls f cannot assume anything regarding the value of Rx after returning from function f.

Optimizable Function—a function f is considered optimizable when the following criteria are met:

1. f is hot.
2. f is fully disassembled, i.e. all its constituent instructions are identified.
3. The total number of the executions of call instructions within f does not exceed the number of times f is invoked.

The optimizer receives the log file and the disassembled code. At an analysis step 43, the basic blocks are classified by the frequency of use. Frequently-used blocks are labeled "hot," and rarely-used blocks are labeled "cold." Correspondingly, hot (cold) functions are functions that are called frequently (rarely).

For each hot function f, the optimizer attempts to pair each non-volatile register used in the function with an available volatile register, at a register pairing step 44. The pairing operation generates the following information:

REG(f)—the set of all non-volatile registers used in hot function f.

VREG(f)—the set of all volatile registers not used in hot function f.

N(f)=MIN(count of registers in REG(F), count of registers in VREG(F)).

OREGS(f)—a set of N(f) matching pairs of registers (Rx, Ry) where Rx is in REG(f) and Ry is in VREG(f).

If OREGS(f) is a non-empty set, the optimizer replaces each reference in the function to a non-volatile register appearing in OREG(f) with a reference to the corresponding volatile register, at a register renaming step 46. For each call instruction in f, the optimizer creates a new section of wrapper code and appends it to the object code at a wrapper creation step 48. The original call instruction to the callee function, CALLi, is replaced with an unconditional branch to the wrapper code at a call instruction replacement step 50. The wrapper code includes instructions which store the current values of all the volatile registers, followed by the call instruction CALLi, then followed by restore instructions that restore all the stored values into the volatile registers, and finally a branch instruction back to the instruction following CALLi in function f. Each volatile register value is preferably saved to the memory location reserved on the program stack for the non-volatile register.

Finally, the optimizer modifies the prolog and epilog of function f by replacing the store and restore instructions of each non-volatile register in OREG(f) in the prolog and epilog with NOP instructions, at a store/restore elimination step 52.

In some cases, a matching volatile register is not needed for saving stores (restores) of a non-volatile register. For example, the non-volatile register could be a "link register," which holds the returning address of a function. The link register is usually implicitly altered only by call instructions, and not used elsewhere in f. Therefore, no special volatile register is required to enable elimination of the store (restore) instructions of the link register from the prolog (epilog) of f. Instead, the link register itself can be saved (restored) at each function call within f.

Table I below lists sample disassembled post-link code of a hot function foo. For the sake of this example, foo is characterized by:

REG(foo)={R29, R30, R31}
VREG(foo)={R4}
N(foo)=MIN(3,1)=1
OREG(foo)={(R29, R4)}

The hot function foo contains call instruction L1 to a callee function bar. The left column in the table below shows the post-link code before optimization, while the right column shows the code after optimization by replacing the use of R29 by use of unused volatile register R4, and by moving the store/restore instructions of R4 and of a link register LR to the wrapper code. Hot code is shown in boldface, while cold code is shown in regular type.

TABLE I

CODE COMPARISON
Hot code is highlighted in boldface type.

| Before optimization | After optimization |
| --- | --- |
| program begin | program begin |
| ... | ... |
| function foo: | function foo: |
| Prolog: | Prolog: |
| store R29,4 (SP) | NOP |
| store R30,8 (SP) | store R30,8 (SP) |
| store R31,12 (SP) | store R31,12 (SP) |
| store LR,0 (SP) | NOP |
| ... | ... |
| Body: | Body: |
| ... | ... |
| R29 <- R30 | R4 <- R30 |
| ... | ... |
| L1: call bar | L1: branch W1 {to wrap code} |
| L2: ... | L2: ... |
| ... | ... |
| Epilog: | Epilog: |
| ... | ... |
| restore R29,4 (SP) | NOP |
| restore R30,8 (SP) | restore R30,8 (SP) |
| restore R31,12 (SP) | restore R31,12 (SP) |
| restore LR,0 (SP) | NOP |
| return | return |
| ... | ... |
| ... | ... |
| program end | W1: store R4,4 (SP) |
| | store LR,0 (SP) |
| | call bar |
| | restore LR,0 (SP) |
| | restore R4,4 (SP) |
| | branch L2 |
| | ... |
| | program end |

Preferably, after performing the optimization described above, a code-straightening algorithm is applied to the generated code in order to remove the unconditional branches to and from the wrapper codes and remove the NOP instructions. Straightening algorithms are known in the art of post-link optimization tools, such as the FDPR (Feedback Directed Program Restructuring) tool offered by IBM Corporation (Armonk, N.Y.) as part of the Performance Tool Box (PTX) for the AIX™ operating system. Further aspects of the FDPR are described in the above-mentioned articles by Haber et al., Henis et al., and Schmidt et al.

It may also occur that, for a given function call instruction to foo, the store instructions regarding the set of optimizable non-volatile registers OREG(foo), are the first consecutive instructions in the prolog of the function. Alternatively, it may be that these store instructions can be rescheduled to the beginning of the prolog without affecting the program semantics. In such cases the redundant store instructions are avoided simply by redirecting the target address of the given call instruction to skip the redundant stores located at the beginning of foo. This approach allows slightly faster execution since NOP instructions are not executed.

Additionally, the restore instructions regarding OREG (foo) may be the last consecutive instructions in the epilog of the function. Alternatively, it may be that these restore instructions can be rescheduled to the end of the epilog without affecting the program semantics. In such cases the redundant restore instructions are avoided simply by replacing the first restore instruction with a return instruction. The NOP instructions remain as uncalled filler in the optimized code so as to maintain the program semantics.

The preferred embodiments described above are all based on the assumption that for the sake of safety, the original post-link code cannot be expanded or shrunk during optimization. The principles of the present invention can also be applied, however, in an environment that enables deletion, addition and movement of code. Such an environment is provided by some post-link compilers, particularly when the entire program can be successfully disassembled, as well as within the framework of an optimizing compiler that exploits profiling information. In this environment, the need for wrapper codes can be avoided by instead inserting the required store and load instructions directly before and after the corresponding call instruction in f. Preferably, instead of replacing the store/restore instructions in the function prolog/epilog with NOP instructions, the store/restore instructions are removed from the prolog/epilog of f.

There are cases in which a single store/restore instruction is used in the prolog/epilog of a function instead of several store/restore instructions. These multiple store/restore instructions are given starting and ending boundaries of non-volatile registers to be stored/restored. One of the boundaries may be implicitly defined as the highest or lowest register. In cases in which an optimizable register is stored/restored by such an instruction, there is no single store/restore associated with the optimizable register that can be replaced with a NOP. In this case, the optimizer will preferably pair the non-volatile register, starting at the explicit bound, with the non-used volatile register in register pairing step 44. The optimizer then changes the bound of the multiple load/store instruction to eliminate the load/store of the non-volatile register in the function prolog/epilog at store/restore elimination step 52.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for code optimization, comprising:
   disassembling object code that has been compiled and linked;
   analyzing the disassembled code so as to identify a first function in the code, the first function including store and restore instructions with respect to one or more non-volatile registers and further including a call instruction to a second function, which second function is performed infrequently when the first function is run;
   identifying one or more volatile registers unused in the first function; and
   modifying the code so as to replace each reference in the first function to at least one of the non-volatile registers with a reference to a corresponding one of the identified volatile registers, and so as to eliminate at least one pair of the store and restore instructions in the first function with respect to the at least one of the non-volatile registers while storing the corresponding one of the identified volatile registers before the call instruction to the second function and restoring the corresponding one of the identified volatile registers after the call instruction to the second function, whereby a number of the store and restore instructions is reduced in the first function and increased in the second function.

2. A method according to claim 1, wherein analyzing the disassembled code comprises profiling the code so as to determine a frequency of calls made by the first function, including the call instruction to the second function, and wherein modifying the code comprises modifying the first function only if the frequency of the calls is less than one call each time the first function is run.

3. A method according to claim 1, wherein modifying the code comprises replacing the call instruction with a branch to a wrapper code that contains the call instruction, together with store and restore instructions with respect to the corresponding one of the volatile registers.

4. A method according to claim 3, wherein the object code comprises a fixed sequence of code instructions ending with a last instruction, and wherein the wrapper code is added to the code after the last instruction, and wherein replacing the call instruction comprises replacing the instruction with the branch to the wrapper code without altering the fixed sequence within the code.

5. A method according to claim 3, wherein analyzing the code comprises identifying a further one of the non-volatile registers to which there is no reference made in the first function, and modifying the code comprises eliminating at least one pair of the store and restore instructions in the first function with respect to the further one of the non-volatile registers, while adding store and restore instructions to the wrapper code with respect to the further one of the non-volatile registers.

6. A method according to claim 1, wherein the function comprises a fixed sequence of code instructions, and modifying the code comprises replacing the at least one pair of the store and restore instructions with NOP instructions.

7. A method according to claim 1, wherein modifying the code to eliminate the at least one pair of the store and restore instructions comprises reordering the instructions so as to make the store instruction a first instruction in the first function, and further modifying control transfers to the first function in the code so as to skip over the store instruction.

8. A method according to claim 1, wherein the first function comprises a final instruction to transfer control upon completion of the first function, and wherein modifying the code to eliminate the at least one pair of the store and restore instructions comprises reordering the instructions so as to make the restore instruction a last instruction in the first function before the instruction to transfer control, and further replacing the restore instruction with the control transfer instruction.

9. A method according to claim 1, wherein the at least one pair of the store and restore instructions comprises a single instruction that acts upon a plurality of registers, and wherein modifying the code to eliminate the at least one pair of the store and restore instructions comprises modifying the single instruction to act upon a subset of the plurality of registers.

10. A method according to claim 1, wherein modifying the code comprises recompiling the object code.

11. A method according to claim 1, wherein storing the corresponding one of the volatile registers comprises saving a value of the corresponding one of the volatile registers to a memory location reserved on a program stack for the at least one of the non-volatile registers.

12. An apparatus for code optimization, comprising a code processor, which is arranged to disassemble object code that has been compiled and linked, to analyze the disassembled code so as to identify a first function in the code, the first function including store and restore instructions with respect to one or more non-volatile registers and further including a call instruction to a second function, which second function is performed infrequently when the first function is run, to identify one or more volatile registers unused in the first function, and to modify the code so as to replace each reference in the first function to at least one of the non-volatile registers with a reference to a corresponding one of the identified volatile registers, and so as to eliminate at least one pair of the store and restore instructions in the first function with respect to the at least one of the non-volatile registers while storing the corresponding one of the identified volatile registers before the call instruction to the second function and restoring the corresponding one of the identified volatile registers after the call instruction to the second function, whereby a number of the store and restore instructions is reduced in the first function and increased in the second function.

13. An apparatus according to claim 12, wherein the code processor is arranged to profile the code so as to determine a frequency of calls made by the first function, including the call instruction to the second function, and wherein the code processor is arranged to modify the code only if the frequency of the calls is less than one call each time the first function is run.

14. An apparatus according to claim 12, wherein the code processor is arranged to replace the existing call instruction with a branch to a wrapper code that contains the call instruction, together with store and restore instructions with respect to the corresponding one of the volatile registers.

15. An apparatus according to claim 14, wherein the object code comprises a fixed sequence of code instructions ending with a last instruction, and wherein the code processor is arranged to add the wrapper code after the last instruction, and to replace the call instruction with the branch to the wrapper code without altering the fixed sequence within the code.

16. An apparatus according to claim 14, wherein the code processor is arranged to identify a further one of the non-volatile registers to which there is no reference made in the first function, to eliminate at least one pair of the store and restore instructions in the first function with respect to the further one of the non-volatile registers, and to add store and restore instructions to the wrapper code with respect to the further non-volatile registers.

17. An apparatus according to claim 12, wherein the code processor is arranged to modify the code so as to replace the at least one pair of the store and restore instructions with NOP instructions.

18. An apparatus according to claim 12, wherein the code processor is arranged to modify the code by reordering the instructions so as to make the store instruction a first instruction in the first function, and by modifying control transfers to the first function in the code so as to skip over the store instruction.

19. An apparatus according to claim 12, wherein the first function comprises a final instruction to transfer control upon completion of the first function, and wherein the code processor is arranged to reorder the instructions so as to make the restore instruction a last instruction in the first function before the instruction to transfer control, and further by replacing the restore instruction with the control transfer instruction.

20. An apparatus according to claim 12, wherein the at least one pair of the store and restore instructions comprises a single instruction that acts upon a plurality of registers, and wherein the code processor is arranged to eliminate the at least one pair of the store and restore instructions by modifying the single instruction to act upon a subset of the plurality of registers.

21. An apparatus according to claim 12, wherein the code processor is arranged to modify the code by recompiling the object code.

22. An apparatus according to claim 12, wherein the code processor is arranged to modify the code so that a value of the corresponding one of the volatile registers is saved to a memory location reserved on a program stack for the at least one of the non-volatile registers.

23. A computer software product, comprising a computer-readable medium in which software is stored, which software, when read by a computer, causes the computer to disassemble object code that has been compiled and linked, to analyze the disassembled code so as to identify a first function in the code, the first function including store and restore instructions with respect to one or more non-volatile registers and further including a call instruction to a second function, which second function is performed infrequently when the first function is run, to identify one or more volatile registers unused in the first function, and to modify the code so as to replace each reference in the first function to at least one of the non-volatile registers with a reference to a corresponding one of the identified volatile registers, and so as to eliminate at least one pair of the store and restore instructions in the first function with respect to the at least one of the non-volatile registers while storing the corresponding one of the identified volatile registers before the call instruction to the second function and restoring the corresponding one of the identified volatile registers after the call instruction to the second function, whereby a number of the store and restore instructions is reduced in the first function and increased in the second function.

24. A product according to claim 23, wherein the software causes the computer to profile the code so as to determine a frequency of calls made by the first function, including the call instruction to the second function, and wherein the software causes the computer to modify the code only if the frequency of calls is less than one call each time the first function is run.

25. A product according to claim 23, wherein the software causes the computer to replace the call instruction with a branch to a wrapper code that contains the call instruction, together with store and restore instructions with respect to the corresponding one of the volatile registers.

26. A product according to claim 25, wherein the object code comprises a fixed sequence of code instructions ending with a last instruction, and wherein the software causes the computer to add the wrapper code after the last instruction, and to replace the call instruction with the branch to the wrapper code without altering the fixed sequence within the code.

27. A product according to claim 25, wherein the software causes the computer to identify a further one of the non-volatile registers to which there is no reference made in the first function, to eliminate at least one pair of the store and restore instructions in the first function with respect to the further one of the non-volatile registers, and to add store and restore instructions to the wrapper code with respect to the further one of the non-volatile registers.

28. A product according to claim 23, wherein the software causes the computer to modify the code so as to replace the at least one pair of the store and restore instructions with NOP instructions.

29. A product according to claim 23, wherein the software causes the computer to modify the code by reordering the instructions so as to make the store instruction a first instruction in the first function, and by modifying control transfers to the first function in the code so as to skip over the store instruction.

30. A product according to claim 23, wherein the first function comprises a final instruction to transfer control upon completion of the first function, and wherein the software causes the computer to reorder the instructions so as to make the restore instruction a last instruction in the first function before the instruction to transfer control, and further to replace the restore instruction with the control transfer instruction.

31. A product according to claim 23, wherein the at least one pair of the store and restore instructions comprises a single instruction that acts upon a plurality of registers, and wherein the software causes the computer to eliminate the at least one pair of the store and restore instructions by modifying the single instruction to act upon a subset of the plurality of registers.

32. A product according to claim 23, wherein the software causes the computer to modify the code by causing a recompilation of the object code.

33. A product according to claim 23, wherein the software causes the computer to modify the code so that a value of the corresponding one of the volatile registers is saved to a memory location reserved on a program stack for the at least one of the non-volatile registers.

* * * * *